US009898634B2

(12) United States Patent
Thouin

(10) Patent No.: US 9,898,634 B2
(45) Date of Patent: Feb. 20, 2018

(54) AUTO-DIAGNOSTIC NFC READER

(71) Applicant: Cubic Corporation, San Diego, CA (US)

(72) Inventor: Philippe Thouin, Escondido, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/487,650

(22) Filed: Apr. 14, 2017

(65) Prior Publication Data

US 2017/0300726 A1    Oct. 19, 2017

Related U.S. Application Data

(60) Provisional application No. 62/322,500, filed on Apr. 14, 2016.

(51) Int. Cl.
    G06K 7/08        (2006.01)
    G06K 7/10        (2006.01)

(52) U.S. Cl.
    CPC ..... G06K 7/10465 (2013.01); G06K 7/10297 (2013.01)

(58) Field of Classification Search
    CPC .. G06F 11/0766; G06F 11/07; G06F 11/0772; G06F 11/0784; G06F 11/2252;
    (Continued)

(56) References Cited

U.S. PATENT DOCUMENTS

2006/0290496 A1*  12/2006  Peeters .............. A61B 5/0002
                                                           340/572.1
2007/0207800 A1*   9/2007  Daley  ................ H04L 41/0803
                                                           455/425

(Continued)

FOREIGN PATENT DOCUMENTS

EP         2731280 A1      5/2014

OTHER PUBLICATIONS

Kim et al., "An Advanced Full Path Loop-back Testing Techniques for Embedded RF Identification (RFID) System-on-a-Chip (SoC) Applications", Microwave Symposium Digest. 2008 IEEE MTT-S International. IEEE. Piscataway. NJ. USA, Jun. 15, 2008, pp. 85-89.

(Continued)

*Primary Examiner* — Thien M Le
(74) *Attorney, Agent, or Firm* — Kilpatrick Townsend and Stockton, LLP

(57) ABSTRACT

A self-diagnosing validation device includes an NFC reader having an RF signal range, an active diagnostic chip positioned within the RF signal range of the NFC reader, a memory, and a processing unit. The active diagnostic chip is configured to be selectively powered during a diagnostic procedure. The processing unit is configured to determine that the diagnostic procedure needs to be performed on the NFC reader and perform the diagnostic procedure. The diagnostic procedure includes activating the active diagnostic chip by supplying power to the active diagnostic chip, reading, using the NFC reader, any data being transmitted by the active diagnostic chip, determining whether any data was read by the NFC reader, and determining whether the NFC reader is functioning properly based at least in part of the determination whether any data was read by the NFC reader.

17 Claims, 5 Drawing Sheets

(58) Field of Classification Search
CPC .............. G06F 11/2294; G06K 7/0095; G06K 19/0723
USPC ........................................................ 235/375
See application file for complete search history.

(56) References Cited

U.S. PATENT DOCUMENTS

| | | | | |
|---|---|---|---|---|
| 2008/0180223 | A1* | 7/2008 | Cato | G06K 7/0095 340/10.4 |
| 2008/0198015 | A1* | 8/2008 | Lawrence | G06K 7/0008 340/572.4 |
| 2008/0274716 | A1* | 11/2008 | Fok | H04W 12/08 455/410 |
| 2010/0153633 | A1* | 6/2010 | Yang | G06F 12/0223 711/104 |
| 2014/0266692 | A1* | 9/2014 | Freedman | G08B 21/245 340/539.11 |
| 2015/0149837 | A1* | 5/2015 | Alonso | G06K 7/10227 714/57 |
| 2015/0379491 | A1 | 12/2015 | Ma et al. | |

OTHER PUBLICATIONS

International Search Report and Written Opinion dated Aug. 22, 2017 for PCT/US2017/027567; all pages.

* cited by examiner

AUTO-DIAGNOSTIC NFC READER

CROSS-REFERENCES TO RELATED APPLICATIONS

This application claims priority to U.S. Provisional Patent Application No. 62/322,500, filed Apr. 14, 2016, entitled "AUTO-DIAGNOSTIC NFC READER," the entire disclosure of which is hereby incorporated by reference, for all purposes, as if fully set forth herein.

BACKGROUND OF THE INVENTION

In transportation and other industries there are often many near field communication (NFC) readers in the field that are distributed in a city or region. Conventionally, when a customer reports that there is an issue with the reader there is no certain way to confirm if the NFC reader is capable of processing a card or other NFC-enabled device. Any issue the customer is experiencing could be induced by the customer himself, a defect in the media the customer is using, and/or the NFC reader. Typically, reported problems result in human technicians being sent to the location of the NFC reader to test the function of the reader with a test NFC card. Given the reasonable likelihood that the error is not indicative of a problem with the NFC reader but rather is a result of user error, many of these service calls end up confirming the NFC reader is functional. These calls can drive up maintenance costs of the NFC readers and prevent technicians from working on other problems.

BRIEF SUMMARY OF THE INVENTION

The present invention is generally directed toward self-diagnostic techniques for NFC readers and audio systems in NFC-enabled validation devices. The systems and methods described herein utilize hardware elements of the validation device to determine whether one or more hardware features are defective, without the need to send a service technician. If a problem is detected with one or more hardware features, the validation device may then transmit a service request to one or more service devices, such as a maintenance office computer or a mobile device carried by a service technician. The service request may detail which hardware features are not functioning properly. While discussed largely in regard to validation devices, the self-diagnostic techniques described herein may be applied to any device utilizing NFC technology and/or having audio inputs and outputs.

In one aspect, a self-diagnosing validation device is provided. The validation device may include an NFC reader having a radio frequency (RF) signal range and an active diagnostic chip positioned within the RF signal range of the NFC reader. The active diagnostic chip may configured to be selectively powered during a diagnostic procedure. The validation device may also include a memory and a processing unit. The processing unit may be configured to determine that the diagnostic procedure needs to be performed on the NFC reader and to perform the diagnostic procedure. The diagnostic procedure may include activating the active diagnostic chip by supplying power to the active diagnostic chip and reading, using the NFC reader, any data being transmitted by the active diagnostic chip. The diagnostic procedure may also include determining whether any data was read by the NFC reader and determining whether the NFC reader is functioning properly based at least in part of the determination whether any data was read by the NFC reader.

In another aspect, a method of self-diagnosing an NFC reader of a validation device is provided. The method may include determining that a diagnostic procedure needs to be performed on an NFC reader of a validation device and performing the diagnostic procedure. The diagnostic procedure may include activating an active diagnostic chip by supplying power to the active diagnostic chip. The active diagnostic chip may be positioned within an RF signal range of the NFC reader. The diagnostic procedure may also include reading, using the NFC reader, any data being transmitted by the active diagnostic chip and determining whether any data was read by the NFC reader. The diagnostic procedure may further include determining whether the NFC reader is functioning properly based at least in part of the determination whether any data was read by the NFC reader.

In another aspect, a non-transitory computer-readable medium having instructions embedded thereon for self-diagnosing an NFC reader of a validation device is provided. The instructions may include computer code for causing a computing device to determine that a diagnostic procedure needs to be performed on an NFC reader of a validation device and to perform the diagnostic procedure. The diagnostic procedure may include activating an active diagnostic chip by supplying power to the active diagnostic chip. The active diagnostic chip is positioned within an RF signal range of the NFC reader. The diagnostic procedure may also include reading, using the NFC reader, any data being transmitted by the active diagnostic chip and determining whether any data was read by the NFC reader. The diagnostic procedure may further include determining whether the NFC reader is functioning properly based at least in part of the determination whether any data was read by the NFC reader.

In another aspect, a self-diagnosing validation device includes a speaker, a microphone, a memory, and a processing unit. The processing unit may be configured to determine that a diagnostic procedure needs to be performed on one or both of the speaker and the microphone and to perform the diagnostic procedure. The diagnostic procedure may include attempting to produce an audible sound using the speaker and detecting, using the microphone, any audible sound produced by the speaker. The diagnostic procedure may also include comparing any detected audible sound to an expected result and determining whether one or both of the speaker or the microphone are functioning properly based on the comparison.

In another aspect, a method of self-diagnosing an audio system of a validation device includes determining that a diagnostic procedure needs to be performed on one or both of a speaker and a microphone of a validation device and performing the diagnostic procedure. The diagnostic procedure may include attempting to produce an audible sound using the speaker and detecting, using the microphone, any audible sound produced by the speaker. The diagnostic procedure may also include comparing any detected audible sound to an expected result and determining whether one or both of the speaker or the microphone are functioning properly based on the comparison.

In another aspect, a non-transitory computer-readable medium having instructions embedded thereon for self-diagnosing an audio system of a validation device is provided. The instructions may include computer code for causing a computing device to determine that a diagnostic procedure needs to be performed on one or both of a speaker and a microphone of a validation device and to perform the diagnostic procedure. The diagnostic procedure may include attempting to produce an audible sound using the speaker and detecting, using the microphone, any audible sound produced by the speaker. The diagnostic procedure may also include comparing any detected audible sound to an expected result and determining whether one or both of the speaker or the microphone are functioning properly based on the comparison.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present invention provide self-diagnostic validation devices that can determine whether their own hardware peripherals are functioning properly, without the need to send out a service technician. Only when it is determined that a hardware issue is truly present will a service call be made. This eliminates technicians from being sent to inspect hardware devices in situations where the issue is due to user error and/or an issue with a user device or media. In some embodiments, the validation devices provided herein self-diagnose by using an active NFC tag that is built into the validation device. The NFC tag may be installed in the reader antenna assembly such that the NFC tag is within a signal range of an NFC reader. The active NFC tag may be controlled either by the reader itself or the host controller and can be activated on demand by the reader/host to emulate a card and data to verify with certainty that the reader is operational resulting in the reader ability to run a self-diagnostic without the need of someone interacting with the reader. This auto diagnostic can be ran on-demand remotely before sending a technician or automatically by the reader/host at some interval to report the health status of the reader which could result in a service call and address an issue even before a customer is impacted. The diagnostic may involve using the NFC reader to scan the NFC tag, and comparing any information from the tag to an expected result. If the scanned data matches, there is likely no problem with the NFC reader, whereas other outcomes may indicate there is an issue with the device. Embodiments of the invention can therefore greatly reduce the cost of operation by reducing the "No Trouble Found" service call.

Figure 1:
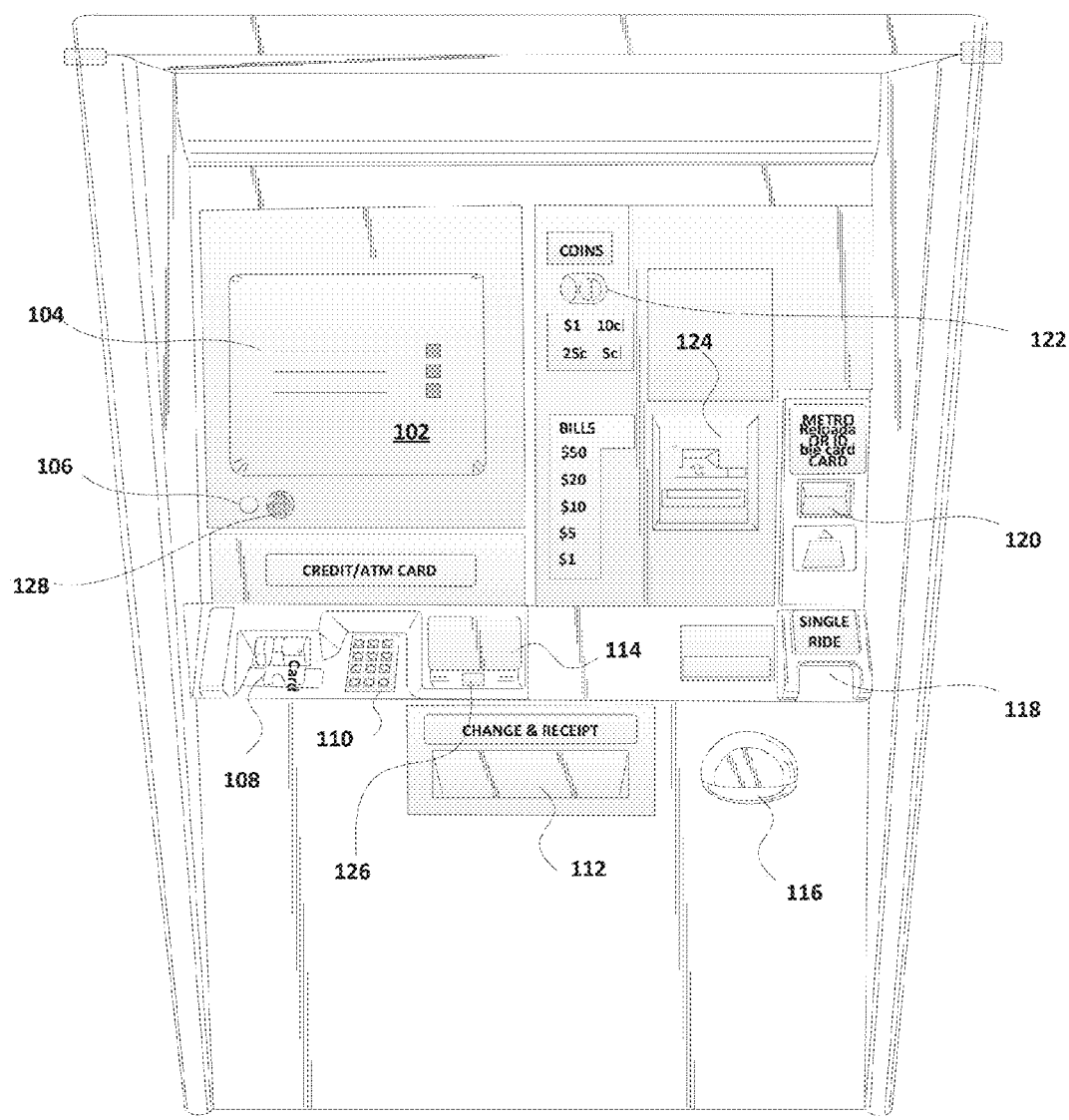
FIG. 1 depicts a self-diagnostic validation device according to embodiments.

Turning now to FIG. 1, an embodiment of a self-diagnostic validation device 100 is provided. Validation devices 100 may include vending machines, ticket validators at transit stops and on transit vehicles, other contactless ticket readers, door entry devices, NFC-enabled retail terminals, parking entry and/or exit controllers, portable hand-held NFC readers and/or any other NFC and/or audio/enabled device. Validation device 100 may include one or more displays 102 on which information related to products and/or services available from a selected remote source, details related to the transaction, instructions on conducting transactions, videos, and/or any other information may be provided. In some embodiments, validation device 100 may have a first screen configured to display a user interface to conduct transactions, while a second screen is used to provide instructions and/or host videos, such as video communications with an agent of a ticket office of a transit system. In other embodiments, a single display 102 may be used for displaying all available content. Validation device 100 may also include one or more input interfaces. For example, input interfaces may include a keypad 110, a touchscreen 104 on display 102, a voice command device such as a microphone 128, and/or any other mechanisms for allowing a user to input information. One or more payment readers may be included on validation device 100. For example, payment readers may include a cash reader 124, a coin reader 122, a credit and/or debit card reader 108, near field communication (NFC) reader 114. It will be appreciated that other payment readers may be included. In some embodiments, NFC reader 114 is configured to read various types of media, such as smart cards, mobile devices, and other media.

Validation device 100 may include one or more printers and/or data writers for printing transaction items such as entry tickets, boarding passes, confirmation tickets, vouchers, receipts, and/or any other documentation related to a transaction. For example, a receipt printer 112 may be used to issue receipts of payments, refunds, and/or other transactions. A fare media printer or writer 118 may be included to issue fare media, such as single ride tickets, smart cards, monthly passes, and the like. In some embodiments, change may be returned to a user in coin tray 116 and/or a cash dispenser. In some embodiments, cash dispenser may be a separate component, while in other embodiments, cash returns may be dispensed near receipt printer 112. In some embodiments, transaction items, such as transit media and receipts, will be issued electronically, rather than a printed hard copy being provided. Validation device 100 may also include a camera, a speaker 106, and/or other audio/visual components to enable audio and/or video communication with a ticket office. Each of the components of the validation device 100 may be controlled by the validation device 100 locally, or remotely by the ticket office. Validation device 100 may be operated in a passenger mode where a user may approach the validation device 100 and interact with the validation device in person and/or in a remote expert mode where an agent from a ticket office controls the software and/or hardware peripherals of the machine, such as when a user needs help completing a transaction.

In some embodiments, the validation device 100 may include an active diagnostic NFC tag or chip 126 that enables the NFC reader 114 to perform self-diagnostic procedures. For example, the active diagnostic chip 126 may be positioned within a radio frequency (RF) signal range of the NFC reader 114, oftentimes within about 4 cm from the NFC reader, although the signal may be operable up to 20 cm in some cases. As just one example, the active diagnostic chip 126 may be positioned on a protrusion or other structure of the validation device 100 such that the chip 126 is within the RF signal range of the NFC reader 114. By using an active NFC chip rather than a passive chip, the chip 126 may be permanently fixed within the RF signal range of the NFC reader 114 without interfering with normal read/write processes, as the active NFC chip 126 will not be read or written to unless powered by the validation device 100 and/or NFC reader 114. It will be appreciated that embodiments may utilize a passive chip if the validation device 100 includes a mechanism that can physically move the passive chip into the RF signal range during a diagnostic procedure and out of the RF signal range when not performing a diagnostic procedure.

In some embodiments, in addition to or the alternate to a selectively powered active diagnostic chip 126, the validation device 100 may include a universal serial bus and/or other serial connection that communicatively couples the active diagnostic chip 126 with a processing unit, such as that in the validation device 100 and/or a processing unit from a remote device. The processing unit(s) can control what the active diagnostic chip will emulate. For example, the processing unit can control data content and/or format of data sent by the active diagnostic chip 126 to emulate various kinds of media.

The active diagnostic chip 126 may be selectively powered and controlled by the NFC reader 114 and/or the validation device 100. For example one or both of the NFC reader 114 and/or the validation device 100 may activate the chip 126 when it is determined that a diagnostic procedure needs to be performed on the NFC reader 114. This may be done in one of several ways. For example, if the NFC reader 114 and/or validation device 100 detects a card read and/or write error, such as when data is read in an improper format, incomplete data is read, there is a failure to write data, and/or other card read errors, the NFC reader 114 and/or validation device 100 may automatically initiate a diagnostic procedure without any prompting from a human input. In other embodiments, the validation device 100 and/or a user of the validation device 100 may report an error to a back office, service center, and/or other service device of the entity operating the validation device 100. For example, a user having a difficult time getting an NFC media read by the NFC reader 114 may contact the operator of the validation device 100, such as by calling, sending an email and/or short messaging service (SMS) message, transmitting a service request from the validation device 100 itself, using an audio and/or video communication enabled through the validation device 100 and/or other method of communication with the operator. In other embodiments, the validation device 100 may detect a card read error and/or other issue and communicate a problem notification to the back office, service center, and/or other service device of the operator. The operator may then remotely communicate a command over a network that causes the validation device 100 and/or NFC reader 114 to commence a diagnostic procedure.

Once it is determined that the diagnostic procedure needs to be run, a processor of the validation device 100 and/or the NFC reader 114 may initiate the diagnostic. In some embodiments, this may include activating the active diagnostic chip 126 by supplying power to the active diagnostic chip 126. The NFC reader 114 may then read any data being transmitted by the active diagnostic chip 126 and determine whether any data was read by the NFC reader 114. Such a determination may be used to analyze whether the NFC reader 114 is functioning properly. For example, if data is read by the NFC reader 114, this may be indicative that the NFC reader 114 is functioning properly and an issue is related to user error and/or a defective media. To fully verify whether the NFC reader 114 is functioning properly, the data read from the active diagnostic chip 126 may be compared to information stored on a memory of the validation device 100 and/or the NFC reader 114. In some embodiments, data stored on the active diagnostic chip 126 may include information written on the active diagnostic chip 126 prior to performing the diagnostic procedure. For example, the memory may include a data file that includes a predetermined expected result that matches an original data file stored on the active diagnostic chip 126. If the information read from the active diagnostic chip 126 matches that stored on the memory, it can be determined that the read functionality of the NFC reader 114 is functioning properly. If, however, the information read from the active diagnostic chip 126 does not match, or only partially matches, that stored on the memory, it can be determined that there is an issue with the read functionality of the NFC reader 114. If no data is read from the chip 126, then there is likely an issue with the NFC reader 114.

In some embodiments where the NFC reader 114 also includes writing capability, a diagnostic procedure may be performed to test the write functionality of the NFC reader 114. In such embodiments, the active diagnostic chip 126 may be rewriteable and/or may include both the data file that includes a predetermined expected result that matches an original data file stored on the active diagnostic chip 126 as well as a second data file that may be rewritten during each write-functionality diagnostic procedure. In embodiments, where only a single file is used, the validation device 100 and/or NFC reader 114 may store the most recent data file in the memory to use in place of the "original" file for comparison during the read-functionality diagnostic test. In embodiments utilizing multiple files, data stored on the active diagnostic chip 126 includes a first file that includes information written on the active diagnostic chip 126 prior to performing the diagnostic procedure and a second file that includes information written on the active diagnostic chip 126 as part of performing the diagnostic procedure.

To perform a write-functionality diagnostic test when the read function of the NFC reader is working properly, the NFC reader 114 and/or validation device 100 may generate a new data file. Oftentimes, the new data file will include unique data, such as a randomly or systematically generated code. In some embodiments, the new file may include a time and/or date of the diagnostic procedure. This new data file may be stored on the memory, either in place of the original file or as a separate rewriteable file. The NFC reader 114 writes this new data file onto the active diagnostic chip 126. The NFC reader 114 may then read any new data being transmitted by the active diagnostic chip 126 and determine whether any data was read by the NFC reader 114. If no new data is read from write-diagnostic file of the chip 126, then there is likely a writing issue with the NFC reader 114. If such data is read by the NFC reader 114, this data may be compared to the information stored on the memory corresponding to the writing diagnostic. If data from the write-diagnostic data file does not match that stored in the memory, the write functionality of the NFC reader 114 is likely not functioning properly. For example, if the write-functionality data field stored in the memory included a time and date of the test and the data read from the chip 126 includes a different date and time, it is likely that the NFC reader 114 is no longer capable of writing data. If the information read from the active diagnostic chip 126 matches that stored on the memory, it can be determined that the write functionality of the NFC reader 114 is functioning properly.

In some embodiments, both the read and write diagnostic procedures may be run in a single session in any order, however the procedures may also be run separately. It will be appreciated that after any diagnostic procedure involving the NFC reader 114 is completed, the active diagnostic chip 126 may be deactivated, such as by cutting off the power supply and/or ending transmission and/or reception of data by the chip 126. This allows the validation device 100 and NFC 114 to be usable in each's normal capacity without signal interference from the active diagnostic chip 126.

In some embodiments, the validation device 100 may be configured to perform self-diagnostic procedures on its audio system. In such embodiments, the speaker 106 and microphone 128 may be positioned such that sound emitted by the speaker 106 may be picked up the by the microphone 128. In some embodiments, this may involve positioning the two components proximate to one another, while in other embodiments, the speaker 106 and microphone 108 may be positioned such that the components point at least partially toward one another. In other embodiments, a secondary speaker and/or microphone may be included solely for diagnostic purposes. For example, a secondary diagnostic microphone may be positioned proximate speaker 106 and/or a secondary diagnostic speaker may be positioned proximate microphone 126.

The validation device 100 may be configured to determine that a diagnostic procedure needs to be performed on the speaker 106 and/or microphone 126. Oftentimes, the diagnostic procedure may be initiated by receiving a diagnostic request from a user input interface of the validation device 100 and/or a service center of the operator. For example, a user having a difficult time hearing audio or speaking into the microphone may contact the operator of the validation device 100, such as by calling, sending an email and/or short messaging service (SMS) message, transmitting a service request from the validation device 100 itself, using an audio and/or video communication enabled through the validation device 100 and/or other method of communication with the operator. In other embodiments, the operator may detect an issue. For example, a clerk of a video validation device 100 may observe that a user of the validation device 100 is unable to hear instructions and/or the clerk cannot hear the user. The clerk may then remotely communicate a command over a network that causes the validation device 100 to commence a diagnostic procedure on the audio system.

Once it is determined that the diagnostic procedure needs to be run, a processor of the validation device 100 may initiate the diagnostic. In some embodiments, this may include attempting to produce an audible sound using the speaker. The audible sound may originate from a sound file stored on the validation device 100. The sound file may be a predetermined sound and/or one or more words. The microphone 126 may detect any audible sound produced by the speaker 106, which may be compared to an expected result to determine whether the speaker 106 and/or the microphone 128 are functioning properly. For example, the validation device 100 may use dictation software identify one or more words or other content from the detected sound and compare the content to a set of words present in the original file. In other embodiments, the sound detected may be analyzed to determine a frequency of the sound. The frequency may be one constant frequency and/or a series of different frequencies. These detected frequencies may be compared to an expected frequency and/or frequency plot to determine whether the speaker 106 and/or microphone 128 are functioning properly. If the values match, it is likely that the validation device's audio hardware is working correctly. If there is no match, it may indicate that there is an issue with the equipment. In embodiments where no sound is detected, there may be an issue with one or both of the speaker 106 and/or the microphone 128 and a technician is likely necessary. For example, the problem may be due to the speaker 106 failing to emit any sound or the microphone 128 failing to pick up any sound.

In some embodiments, the functionality of the microphone 128 may also be tested by receiving an audio input from a user. For example, the validation device 100 may prompt the user to produce an audible sound. The request may be provided as a textual and/or image message on display 102 or other display of the validation device, using a voice command emitted by the speaker 106, and/or based on an interaction with a video agent or clerk. In some embodiments, the request may include an indication of a specific sound the user should produce. For example, the request may instruct the user to speak a specific word or phrase. In other embodiments, the request may include instructions for a user to produce a sound using a mobile device, such as a phone or tablet computer. For example, the user may open a mobile application that is associated with the validation device 100 and/or operator. The user may then select a diagnostic sound icon from the application interface, thereby causing the mobile device to play a predetermined sound file.

The user may then produce an audible sound, such as by speaking the word or phrase provided by the validation device 100 and/or by causing the mobile device to play the sound file. The microphone 128 attempts to detect any sound produced such that the validation device 100 can determine whether the microphone 128 is working properly. For example, any received sound may be compared with the provided word or phrase or expected sound file. If the detected sound matches the expected result, the microphone 128 is working properly. If the sound does not match the expected result or no sound is detected, there is likely some issue with the microphone 128.

The audio diagnostic tests described herein may be difficult to implement in some situations, such as those where the validation device 100 is positioned in a crowded and/or otherwise loud setting. To combat the excess noise, the audible sound may include data that is transmitted over the speaker and received by the microphone. The received data may be decoded to confirm that the data transmitted to the speaker is the data that was received by the microphone. The volume and the frequency of the data signal may be adjusted to further distinguish the data signal from the ambient noise. To further combat excess noise, sound enhancement processes may be performed on the detected sound prior to attempting to compare the detected sound with an expected result. For example, the detected sound may be filtered to remove background noise and/or the amplitudes of the sound waves may be adjusted to alter the volume of the detected sound. In some embodiments, the validation device 100 may utilize active noise control (noise-cancellation) to cancel background noise while detecting any audible sound produced from the speaker 106, a user, and/or a mobile device. This may be done, for example, by identifying a sound to be canceled and adding a cancellation sound having a same amplitude and frequency and an opposite phase of the sound to be canceled. It will be appreciated that any combinations of sound enhancements and audio engineering may be provided to ensure that the audio tests are accurate in noisy environments.

Upon completion of one or more diagnostic procedures, the validation device 100 may detect one or more issues with the NFC reader 114, speaker 106, and/or microphone 128. If one or more problems are detected, the validation device 100 may communicate a service request to a remotely located service device based on an outcome of the diagnostic procedure. For example, the validation device 100 may send an electronic message to a service center and/or a service device, such as a mobile device carried by a service technician. The service request may include a health status of the NFC reader, such as an indicator of what hardware peripheral(s) are likely experiencing issues. The requests may also include an identifier of the validation device 100 and a time and/or date of the latest diagnostic test(s). The service request may also include a result of the test. For example, a service request may indicate that there was a partial data match during the read test for the NFC reader 114 or report that no sound was detected using the microphone 128, as such information may aid the technician in more quickly diagnosing a cause of the malfunction. In some embodiments, the validation device 100 may be shut down remotely from the service center and/or a service device. For example, when a technician reviews a service request and determines that the validation device is likely not functioning properly, the service technician may send a command from a mobile device or other service device that causes the validation device 100 to shutdown, thereby removing it from service until the technician arrives and can service the validation device 100. This not only prevents more customers from using the malfunctioning validation device 100, but can also help reduce the service time of the validation device 100 by ensuring that the validation device 100 is not in service unless it is functioning properly.

It will be appreciated that a validation device 100 may include any combination of the diagnostic capabilities described herein. For example, a validation device 100 may include only NFC reader 114 diagnostics or audio diagnostics. In embodiments where the NFC reader 114 has no write capabilities, the validation device 100 will not include the NFC write diagnostic ability.

Figure 2:
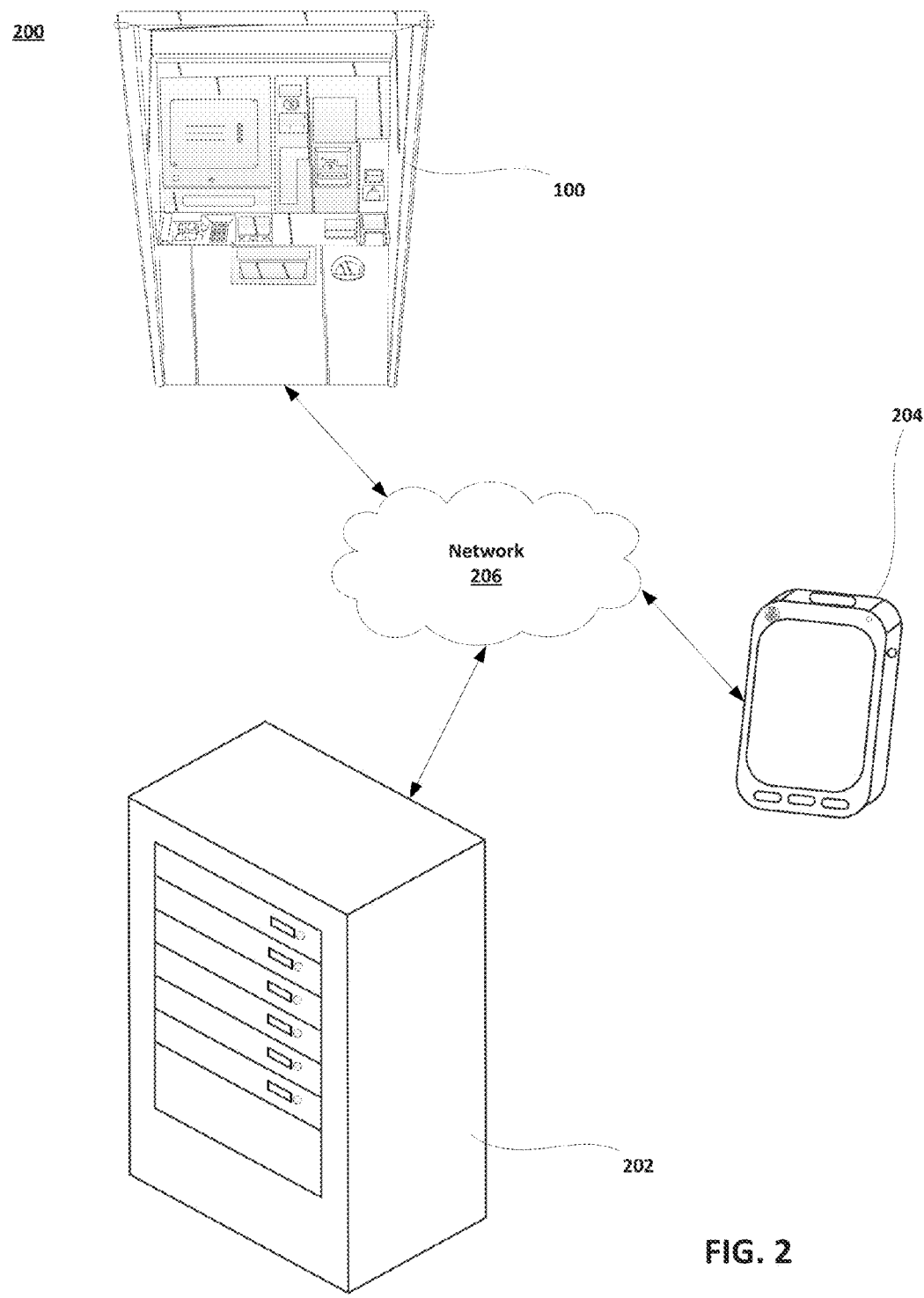
FIG. 2 depicts a system diagram for reporting diagnostic information according to embodiments.

FIG. 2 depicts a system 200 for diagnostic reporting. The system 200 may include one or more validation devices 100 or other self-diagnostic devices, a service center 202, and/or one or more mobile service devices 204. Each of the devices in system 200 may be communicatively coupled using one or more local area networks (LAN) 206 and/or other wired and/or wireless networks 206. Network 206 may utilize one or more of Wi-Fi, ZigBee, Bluetooth™ Bluetooth™ Low Energy, a cellular communications protocol such as 3G, 4G, or LTE, and/or any other wireless communications protocol. It will be appreciated that one or more different network connections may be used in accordance with the invention, and that the use of a single network 206 to enable communications is merely one example of such configurations. For example, each component may be communicatively coupled with other components using a separate network for one or more of the connections. The connections between the service center 202, mobile service devices 204, and the validation device 100 may be secure. This may be done using encryption over a public network, a private network, a secure virtual private network (VPN), or any other method of securing a connection.

In practice, once a validation device 100 or other self-diagnostic device performs a diagnostic procedure and determines that some sort of maintenance is required, the validation device 100 communicates a service request to one or both of the service center 202 and/or one or more of the mobile service devices 204. For example, the validation device 100 may send an electronic message using email, SMS message, automated phone message, push notification, and/or any other electronic message. The service request may include identification information for both the malfunctioning validation device 100 and for problems associated with the validation device 100 hardware peripherals as detected by the diagnostic procedures, as described in relation to FIG. 1. The received requests may be used by service technicians and other personnel to determine when and where to dispatch technicians for maintenance. In some embodiments, the service requests are stored on service logs at one or both of the service center 202 and one or more of the mobile service devices 204 to provide a more complete maintenance and trouble report for each validation device 100. The service center 202 and one or more of the mobile service devices 204 may also communicate with the validation device 100 over network 206 to send a command that causes the validation device 100 to shutdown, thereby removing it from service until the technician arrives and can service the validation device 100.

Figure 3:
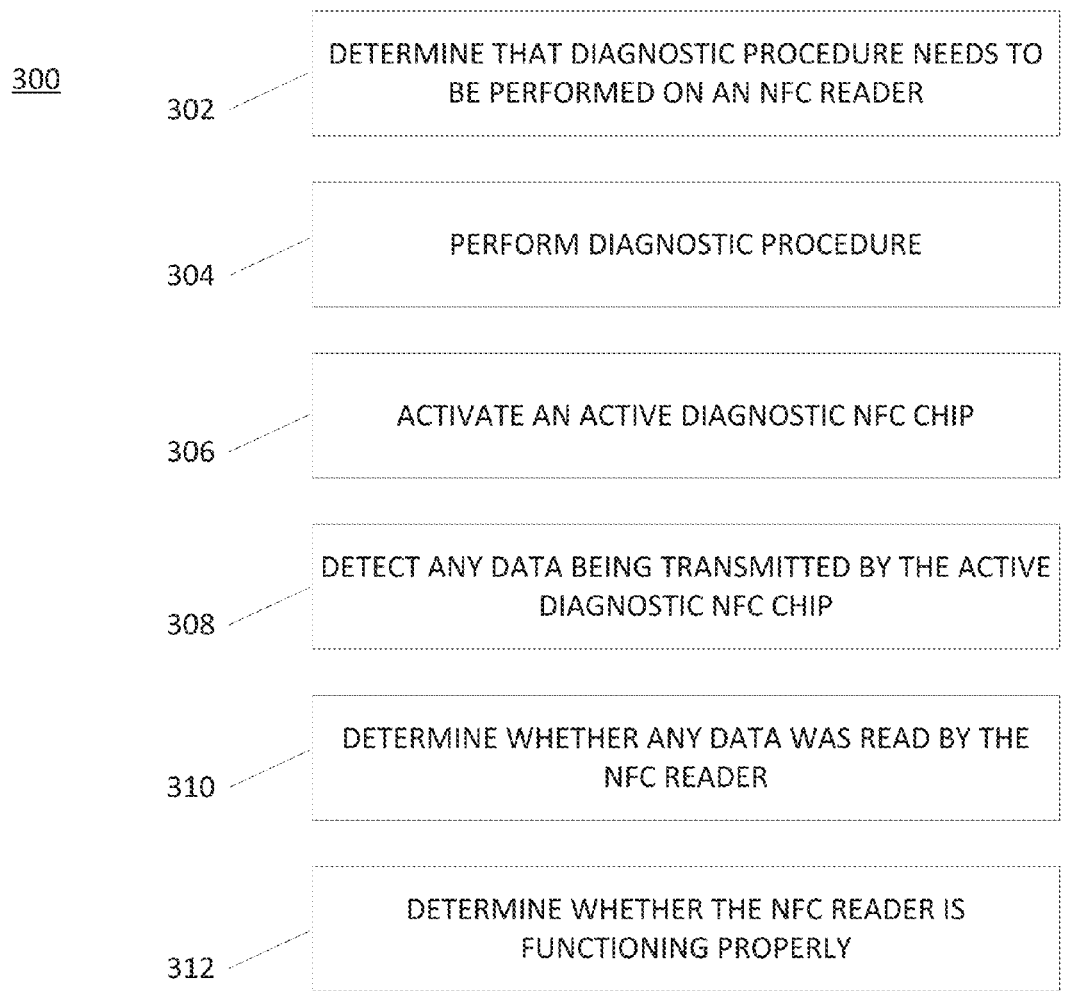
FIG. 3 depicts a flowchart of a process for self-diagnosing a near field communication (NFC) reader of a validation device according to embodiments.

FIG. 3 is a flowchart depicting a process 300 for self-diagnosing an NFC reader of a validation device. Process 300 may be performed by a validation device such as validation device 100 described herein, or by another NFC enabled device. The process may be controlled using a host processor of the validation device and/or a processor of the NFC reader itself. Process 300 begins by determining that a diagnostic procedure needs to be performed on an NFC reader of a validation device at block 302. Such a determination may be made automatically by the validation device itself, such as when the machine detects a card read and/or write error. In other embodiments, a user of the validation device may suspect there is a problem with the NFC reader based on their interactions with the device. The user may be able to select a "perform diagnostic" key or similar icon on the validation device and/or communicate with an operator of the validation device, who can in turn send a command initiating a diagnostic procedure. The diagnostic procedure may be performed at block 304. The diagnostic procedure may include activating an active diagnostic chip by supplying power to the active diagnostic chip at block 306. The chip may include one or more data files. For example, a first data file may include information written on the active diagnostic chip prior to performing the diagnostic procedure, such as a control file containing predetermined data. The NFC reader may then detect any data being transmitted by the active diagnostic chip at block 308 and determine whether any data was read by the NFC reader at block 310. A determination as to whether a read function of the NFC reader is functioning properly may then be made at block 312. For example, if no data is read, there is likely a problem with the NFC reader. If data is read, the data may be compared to that on a memory of the validation device and/or NFC reader. For example, the memory may include a data file mirroring the information stored in the control file of the active diagnostic chip. If the data read from the chip matches that in the memory, it is likely that the NFC reader's read function is working properly. If the data does not match, there is likely a problem with the NFC reader.

In some embodiments, the process 300 may include steps to determine whether a write function of the NFC reader is functioning properly. For example, process 300 may include generating a new data file. For example, a new data file may include unique information, such as a time and date of the diagnostic procedure. The new data file may be stored on the memory of the validation device and/or the NFC reader where it either replaces the original data file or acts as an additional "write-only" comparison file. The new data file may then be written (or attempted to be written) on the active diagnostic chip. For example, the new data file may replace the control file and/or be stored as an additional file on the active diagnostic chip. The NFC reader may then attempt to read the new data file from the active diagnostic chip. As before, if the data does not match or no data is detected, there is likely an issue with the NFC reader.

Oftentimes, if a problem is detected, the validation device may communicate a service request to a remotely located service device, such as a service center or mobile service device. The service request may include identification information for both the malfunctioning validation device and for problems associated with the validation device hardware peripherals as detected by the diagnostic procedures, as described in relation to FIG. 1.

Figure 4:
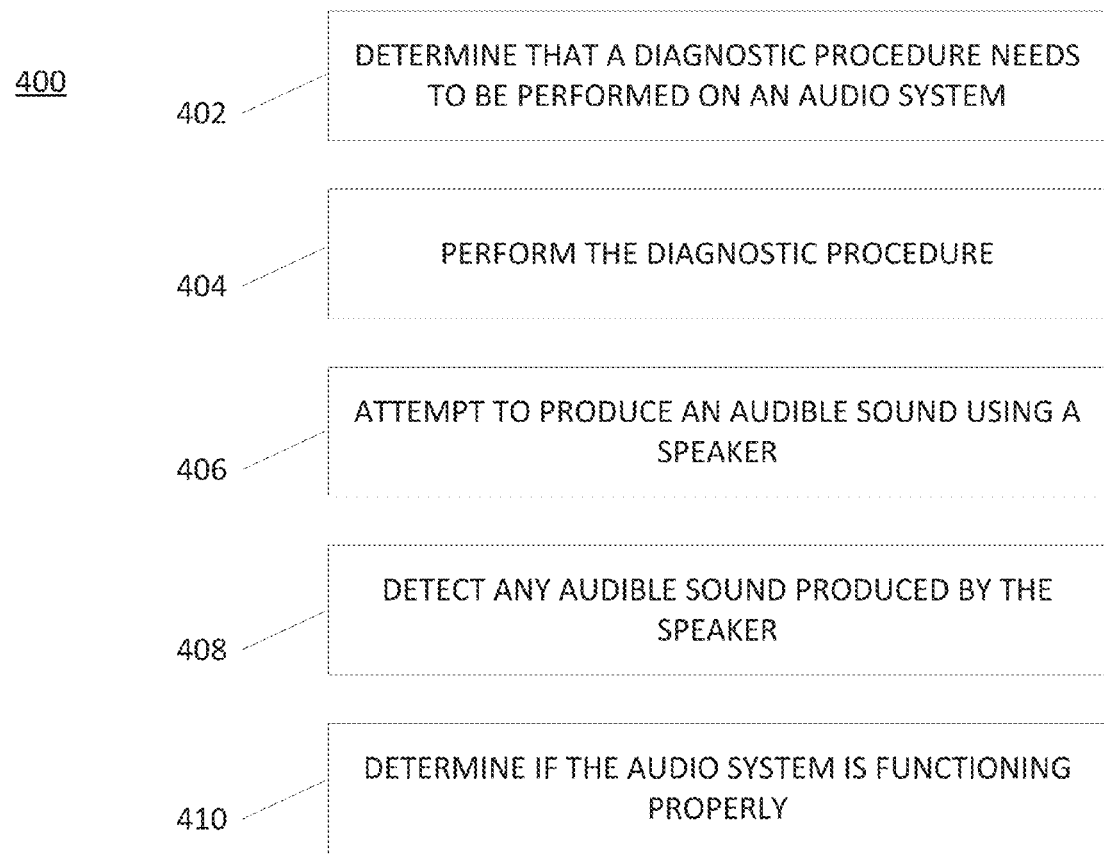
FIG. 4 depicts a flowchart of a process for self-diagnosing an audio system of a validation device according to embodiments.

FIG. 4 is a flowchart depicting a process 400 for self-diagnosing an audio system of a validation device. Process 400 may be performed by a validation device such as validation device 100 described herein, or by another device having at least one speaker and at least one microphone. The process may be controlled using a processor of the validation device. Process 400 begins by determining that a diagnostic procedure needs to be performed on one or both of a speaker and a microphone of a validation device at block 402. For example, a user may interact with an input device of the validation device to contact an operator of the validation device or to otherwise initiate a diagnostic procedure. In other embodiments, the operator may determine that there is an issue with the audio system and remotely communicate a command over a network that causes the validation device 100 to commence a diagnostic procedure on the audio system.

At block 404, the diagnostic procedure is performed. This may include attempting to produce an audible sound using the speaker at block 406. For example, a sound file with a specific sound pattern may be played by the validation device to emit sound via the speaker. In noisy environments, the audible sound may include encoded data that is transmitted over the speaker. At block 408, a microphone of the validation device may detect any audible sound produced by the speaker. This detected sound may be compared to an expected result, such as the contents of the original sound file. As one example, the received data may be decoded to confirm that the data transmitted to the speaker is the data that was received by the microphone. As another example, dictation software may be run on the detected sound to determine whether a word or set of words were produced by the speaker. In other embodiments, a frequency of the detected sound may be compared to a frequency or frequency plot of the original sound file. This comparison may be used to determine if the audio system is operating correctly at block 410. For example, if the detected sound matches the expected result, it is likely that the audio system is functioning properly. If there is a mismatch, or no sound is detected, the speaker and/or microphone is likely malfunctioning.

To facilitate audio diagnostics in crowded and/or otherwise noisy environments, process 400 may also include enhancing the detected audible sound. For example, background noise may be filtered out and/or canceled using active noise control. In some embodiments, the detected sound may have an amplitude adjusted to make it contrast with background noise and/or to be sufficiently loud to discern detected sounds. For example, the volume and the frequency of the data signal may be adjusted to further distinguish the data signal from the ambient noise. It will be appreciated that other audio enhancements may be performed instead of, or in combination with some or all of the above enhancements.

Oftentimes, if a problem is detected, processes 400 will include the validation device communicating a service request to a remotely located service device, such as a service center or mobile service device. The service request may include identification information for both the malfunctioning validation device and for problems associated with the validation device hardware peripherals as detected by the diagnostic procedures, as described in relation to FIG. 1.

Figure 5:
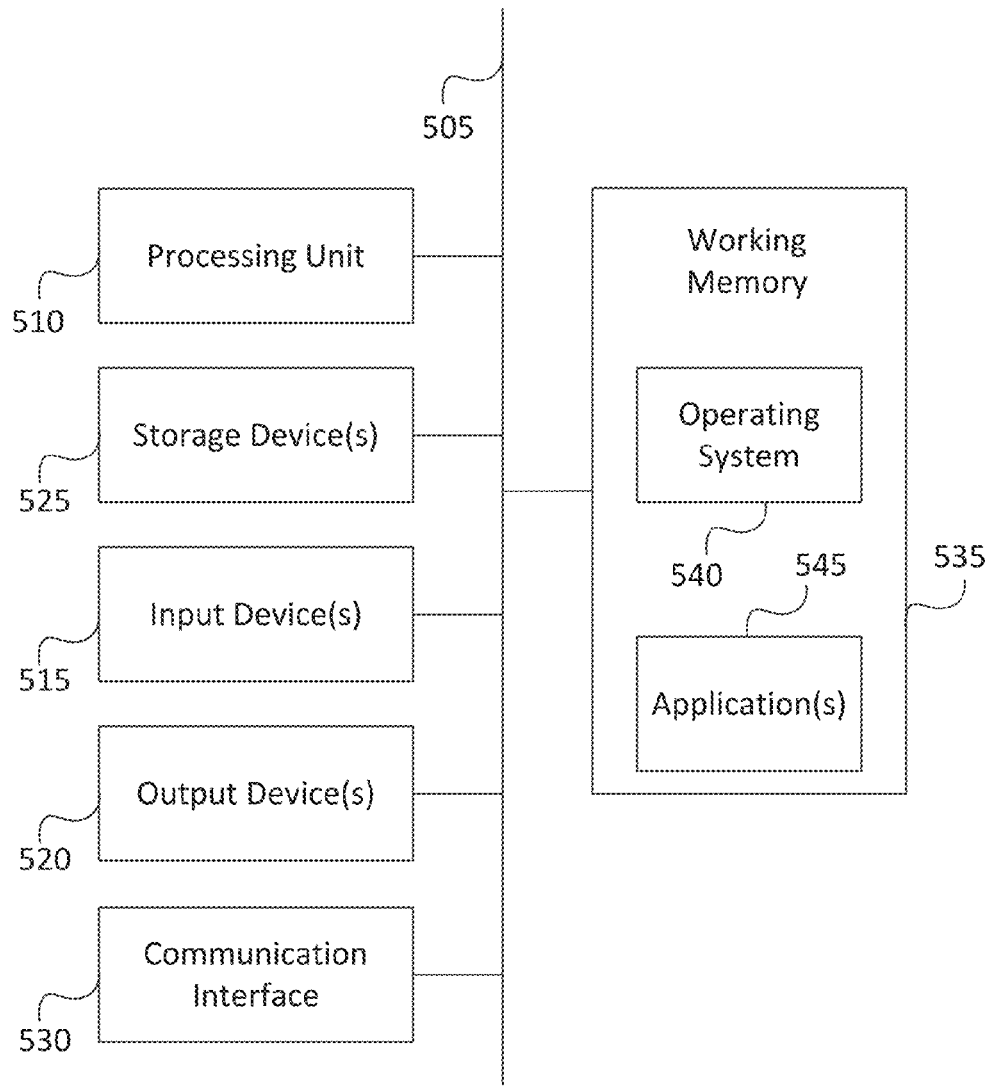
FIG. 5 is a block diagram of an example computing system according to embodiments.

A computer system as illustrated in FIG. 5 may be incorporated as part of the previously described computerized devices. For example, computer system 500 can represent some of the components of the validation devices, NFC readers, service devices, and/or mobile devices described herein. FIG. 5 provides a schematic illustration of one embodiment of a computer system 500 that can perform the methods provided by various other embodiments, as described herein. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more processors, such as one or more special-purpose processors (such as digital signal processing chips, graphics acceleration processors, and/or the like); one or more input devices 515, which can include without limitation a keyboard, a touchscreen, receiver, a motion sensor, a camera, a smartcard reader, a contactless media reader, a microphone, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A self-diagnosing validation device, comprising:
   a near field communication (NFC) reader having a radio frequency (RF) signal range;
   an active diagnostic chip positioned within the RF signal range of the NFC reader, wherein the active diagnostic chip is configured to be selectively powered during a diagnostic procedure;
   a memory; and a processing unit configured to:
  determine that the diagnostic procedure needs to be performed on the NFC reader by receiving a diagnostic request from one or both of an input at a user interface of the validation device or a service center; and
  perform the diagnostic procedure based on receiving the diagnostic request, the diagnostic procedure comprising:
    activating the active diagnostic chip by supplying power to the active diagnostic chip;
    reading, using the NFC reader, any data being transmitted by the active diagnostic chip;
    determining whether any data was read by the NFC reader; and
    determining whether the NFC reader is functioning properly based at least in part of the determination whether any data was read by the NFC reader.

2. The self-diagnosing validation device of claim 1, wherein the diagnostic procedure further comprises:
  comparing any data read by the NFC reader to information stored on the memory, wherein the determination whether the NFC reader is functioning properly is further based on the comparison.

3. The self-diagnosing validation device of claim 1, wherein the processing unit is further configured to:
  communicate, via a network, a service request to a remotely located service device based on an outcome of the diagnostic procedure.

4. The self-diagnosing validation device of claim 1, wherein the diagnostic procedure further comprises:
  generating a new data file;
  storing the new data file on the memory; and
  writing the new data file to the active diagnostic chip, wherein the any data being transmitted by the active diagnostic chip comprises the new data file.

5. The self-diagnosing validation device of claim 1, wherein:
  the processing unit is controlled by the NFC reader.

6. The self-diagnosing validation device of claim 1, wherein:
  the processing unit is a host processor controlled by the validation device.

7. A method of self-diagnosing a near field communication (NFC) reader of a validation device, comprising:
  determining that a diagnostic procedure needs to be performed on an NFC reader of a validation device by detecting a read error using the NFC reader; and
  performing the diagnostic procedure, wherein performance of the diagnostic procedure is automatically triggered by the detection of the read error, the diagnostic procedure comprising:
    activating an active diagnostic chip by supplying power to the active diagnostic chip, wherein the active diagnostic chip is positioned within a radio frequency (RF) signal range of the NFC reader;
    reading, using the NFC reader, any data being transmitted by the active diagnostic chip;
    determining whether any data was read by the NFC reader; and
    determining whether the NFC reader is functioning properly based at least in part of the determination whether any data was read by the NFC reader.

8. The method of self-diagnosing a near field communication (NFC) reader of a validation device of claim 7, wherein:
  data stored on the active diagnostic chip comprises information written on the active diagnostic chip prior to performing the diagnostic procedure.

9. The method of self-diagnosing a near field communication (NFC) reader of a validation device of claim 7, wherein:
  data stored on the active diagnostic chip comprises information written on the active diagnostic chip as part of performing the diagnostic procedure.

10. The method of self-diagnosing a near field communication (NFC) reader of a validation device of claim 7, further comprising:
  communicating, via a network, a service request to a remotely located service device based on an outcome of the diagnostic procedure.

11. The method of self-diagnosing a near field communication (NFC) reader of a validation device of claim 10, wherein:
  the service request comprises a health status of the NFC reader.

12. The method of self-diagnosing a near field communication (NFC) reader of a validation device of claim 7, wherein the diagnostic procedure further comprises:
  comparing any data read by the NFC reader to information stored on the memory, wherein the determination whether the NFC reader is functioning properly is further based on the comparison.

13. A non-transitory computer-readable medium having instructions embedded thereon for self-diagnosing a near field communication (NFC) reader of a validation device, the instructions comprising computer code for causing a computing device to:
  determine that a diagnostic procedure needs to be performed on an NFC reader of a validation device by detecting a read error using the NFC reader; and
  perform the diagnostic procedure, wherein performance of the diagnostic procedure is automatically triggered by the detection of the read error, the diagnostic procedure comprising:
    activating an active diagnostic chip by supplying power to the active diagnostic chip, wherein the active diagnostic chip is positioned within a radio frequency (RF) signal range of the NFC reader;
    reading, using the NFC reader, any data being transmitted by the active diagnostic chip;
    determining whether any data was read by the NFC reader; and
    determining whether the NFC reader is functioning properly based at least in part of the determination whether any data was read by the NFC reader.

14. The non-transitory computer-readable medium of claim 13, wherein performing the diagnostic procedure comprises:
  comparing any data read by the NFC reader to information stored on the memory, wherein the determination whether the NFC reader is functioning properly is further based on the comparison.

15. The non-transitory computer-readable medium of claim 13, wherein the instructions further comprise computer code for causing the computer device to:
  communicate, via a network, a service request to a remotely located service device based on an outcome of the diagnostic procedure.

16. The non-transitory computer-readable medium of claim 13, wherein performing the diagnostic procedure comprises:
  generating a new data file;

storing the new data file on the memory; and writing the new data file to the active diagnostic chip, wherein the any data being transmitted by the active diagnostic chip comprises the new data file.

17. The non-transitory computer-readable medium of claim 13, wherein:

data stored on the active diagnostic chip comprises a first file that includes information written on the active diagnostic chip prior to performing the diagnostic procedure and a second file that includes information written on the active diagnostic chip as part of performing the diagnostic procedure, wherein the any data being transmitted by the active diagnostic chip comprises one or both of the first file and the second file.

* * * * *